United States Patent [19]

Pratt

[11] Patent Number: 5,745,042

[45] Date of Patent: *Apr. 28, 1998

[54] LOAD INSULATOR

[76] Inventor: Hugh Michael Pratt, Marchioness Building, Commerial Road, Bristol BS1 6TG, United Kingdom

[*] Notice: The term of this patent shall not extend beyond the expiration date of Pat. No. 5,568,132.

[21] Appl. No.: 687,156

[22] Filed: Jul. 24, 1996

Related U.S. Application Data

[63] Continuation of Ser. No. 190,776, Feb. 1, 1994, Pat. No. 5,568,132.

[30] Foreign Application Priority Data

Feb. 3, 1993 [GB] United Kingdom .................. 9302122

[51] Int. Cl.⁶ .................................................. G08B 21/00
[52] U.S. Cl. ........................ 340/657; 340/647; 340/685; 324/557; 174/157; 174/116 R
[58] Field of Search ........................... 340/657, 647, 340/665, 668, 685, 678; 324/657; 174/30, 138 R, 163 R, 157, 166 R, 208, 110 R, 138 G

[56] References Cited

U.S. PATENT DOCUMENTS

| | | | |
|---|---|---|---|
| 372,940 | 11/1887 | Soden et al. | 174/208 |
| 476,828 | 6/1892 | Seymour | 174/208 |
| 2,286,488 | 6/1942 | Johnson | 174/174 |
| 3,320,524 | 5/1967 | Miller, Jr. | 324/557 |
| 4,833,415 | 5/1989 | Nourai et al. | 324/557 |
| 4,952,881 | 8/1990 | Pearson | 324/557 |
| 4,977,783 | 12/1990 | Pratt | 73/862.39 |
| 5,086,651 | 2/1992 | Westermo et al. | 340/665 |
| 5,224,388 | 7/1993 | Pratt | 73/862.632 |
| 5,303,164 | 4/1994 | Masson et al. | 340/647 |
| 5,568,132 | 10/1996 | Pratt | 340/657 |

FOREIGN PATENT DOCUMENTS

| | | |
|---|---|---|
| 0280588 | 4/1929 | United Kingdom . |
| 2205411 | 12/1988 | United Kingdom . |

OTHER PUBLICATIONS

U.S. Patent application serial No. 08/190,776, filed Feb. 1, 1994 (PD-3314).

*Primary Examiner*—Jeffrey Hofsass
*Assistant Examiner*—Julie B. Lieu
*Attorney, Agent, or Firm*—Loeb & Loeb LLP

[57] ABSTRACT

A load insulator 2, for interposition into a loaded line, comprises a plurality of mechanical links 4 connected together to form a chain, and an electrical insulator 8 arranged between a pair of adjacent interlocked links 10,12 in the form of an insert of insulative material to electrically isolate the links 10,12 of the pair from each other. A load sensing device may be provided for sensing the strain on the mechanical link. A measuring device 24 for measuring the resistance of the insulator 8 is provided to check the electrical condition of the load insulator, whilst a recording and indicating device allows for recording of electrical strikes and provide a lifetime expiry indicator.

1 Claim, 5 Drawing Sheets

LOAD INSULATOR

This is a continuation application of application Ser. No. 08/190,776 filed on Feb. 1, 1994 now U.S. Pat. No. 5,568,132.

BACKGROUND OF THE INVENTION

The present invention relates to a load insulator, and in particular to a load insulator for interposition between a lifting device and a load, so as to electrically isolate the load from the lifting device.

Where heavy loads are lifted by cranes or other similar mobile lifting apparatus, a particular danger exists from overhead power lines. If a part of a crane contacts a power line, a worker who is in electrical contact with the load, such as a rigger who may be controlling the lateral movement of the load, for example by means of ropes, or may himself be in physical contact with the load, may be in danger of severe electrocution as current passes to earth. Amongst fatalities in crane-related accidents, such electrocutions, according to a recent survey, amount to some 44% of total fatalities. Accidents of this nature also give rise to many serious injuries each year.

DISCUSSION OF THE PRIOR ART

It has been previously proposed to incorporte a device to insulate a load from a lifting apparatus in the form of a device which is interposed into a loaded line. A device of this type made by Miller Swivel Products Inc comprises a body having oppositely disposed fastening lugs for attachment to a lifting apparatus, and to a load or loaded line respectively. The body comprises a series of alternating metallic and insulative plates with various plates interconnected by a plurality of fixing bolts passing through holes provided in the plates. The arrangement is such that the fixing lugs are electrically isolated from each other.

A problem with this form of device is that it is of relatively low overall strength and is itself rather heavy. A 25 tonne unit is typically of 100 Kg.

SUMMARY OF THE INVENTION

The present invention seeks to provide a device which is of simple overall construction, and which is strong and of relatively light weight.

According to a first aspect of the present invention there is provided a load insulator for interposition into a loaded line, comprising a plurality of mechanical links connected together to form a chain, and an electrical insulator arranged between a pair of adjacent interlocked links to electrically isolate the links of the pair from each other.

This arrangement allows a load insulator of very high strength to be provided. Mechanical security is achieved, since, should the insulative material fail structurally as a result of a severe overload, the chain links will still provide support of the load. Also, arranging the insulative material between interlocked links ensures that the material is maintained in compression, giving rise to a particularly strong overall arrangement.

Preferably, the electrical insulator comprises an insert which is formed with seating surfaces shaped to receive opposed surfaces of the interlocked links, to maintain the pair of interlocked links in a spaced condition.

By forming seats for receiving the opposed surfaces, the insert can be readily maintained in position without any additional fixing means being required.

Preferably, the insert is provided with a pair of generally saddle-shaped surfaces, inverted and twisted through substantially 90° with respect to each other. The saddle-shapes are particularly effective to ensure that the interlocked chain links are stably supported with respect to each other.

According to a further aspect of the invention there is provided a load-bearing insert for location between a pair of interlocked chain links of a load-bearing chain, comprising a member of electrically insulative material provided with seating surfaces shaped to receive opposed surfaces of the interlocked links, to maintain the pair of interlocked links in a spaced condition.

A further problem of the prior art load insulator referred to above is that the condition of the device may deteriorate with use, whilst the user would be unaware of any reduction in insulative effect.

According to a further aspect of the invention there is provided a load insulator unit comprising a load-bearing support provided with fixing means adapted to allow interposition of the unit in a loaded line, the load-bearing support incorporating insulator means disposed to prevent conduction of electricity between the fixing means, wherein means are incorporated within the unit for measuring the resistance of the insulative body.

The user can thereby check the electrical condition of the unit prior to use, to confirm its effectiveness.

Preferably, the means for monitoring the resistance comprises a power supply for applying a voltage across the insert and means for measuring the current leakage.

Preferably, the load insulator unit further comprises a microprocessor, and warning means, and is adapted to output a warning signal if the detected resistance drops below a predetermined value. More preferably, the warning means comprises a display, and switch means are provided for actuation by a user prior to use of the load insulator unit to actuate a test of the resistance of the insulator means, and wherein a warning signal is displayed on the display means if the resistance is below the predetermined value.

According to a further aspect of the invention there is provided a load insulator unit comprising a load-bearing support provided with fixing means adapted to allow interposition of the unit in a loaded line, the support incorporating insulator means disposed to prevent conduction of electricity between the fixing means, wherein the unit is further provided with microprocessor means including a clock, and display means, and is arranged to output a warning signal to said display means after a predetermined period of time from initial use.

In this manner, the user can be informed that the unit should be returned to the manufacturers for servicing and recalibration.

According to a further aspect of the present invention there is provided a load insulator unit comprising a load-bearing support provided with fixing means adapted to allow interposition of the unit in a loaded line, said support incorporating insulator means disposed to prevent conduction of electricity between the fixing means, wherein the unit is further provided with voltage detection means, and a microprocessor including memory means and is adapted to record electrical strikes occurring an accidental contact with a power line which is detected by said voltage detection means.

The microprocessor may include a clock and be arranged to record the date and time of incidences of electrical strikes.

In this way, the electrical history of the unit may be monitored. This may be useful for assessment of operating practices, as well as the practices of individual personnel.

According to a further aspect of the invention there is provided a combined load insulator unit and load measuring device, comprising a load-bearing support provided with fixing means adapted to allow interposition of the unit within a loaded line, said support incorporating insulator means disposed to prevent conduction of electricity between the fixing means, wherein load sensing means are disposed on the support for sensing the strain on the support.

Preferably, processing means are provided in the unit to process the signal from the sensing means and to output a signal indicative of applied load.

Combining a load insulator and load measuring device into a single unit provides an extremely useful dual-purpose product of lower cost, size and weight as compared to separate devices.

BRIEF DISCUSSION OF THE DRAWINGS

Embodiments of the invention are described, by way of example only, with reference to the following drawings in which.

Figure 3A:
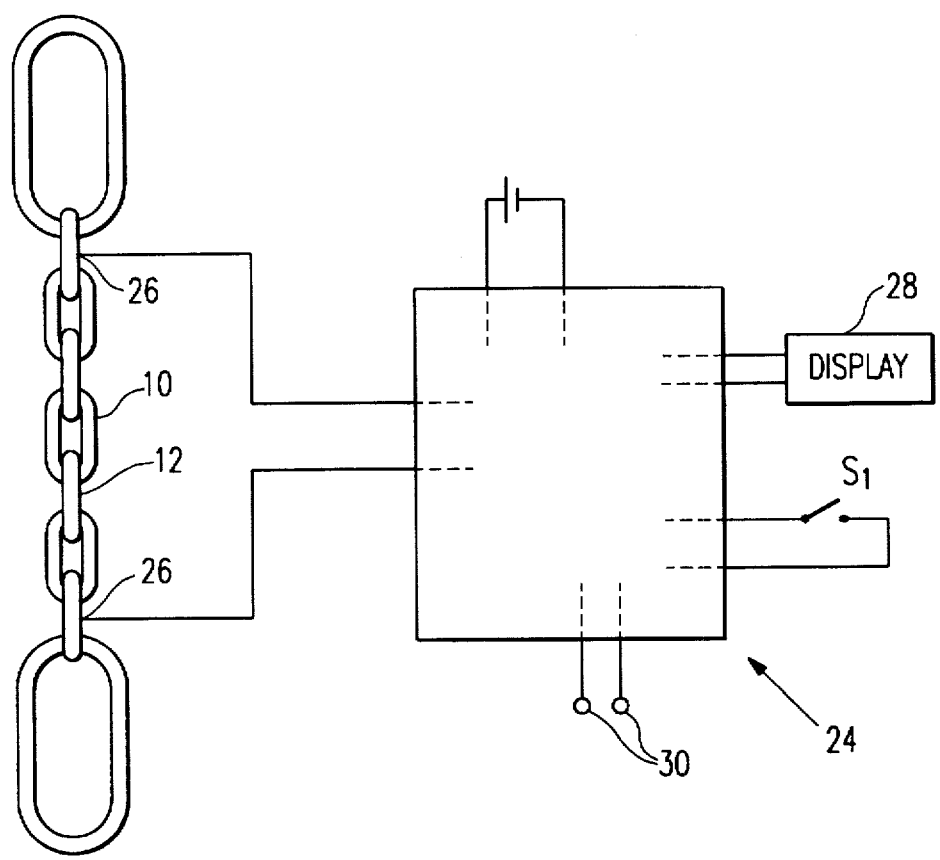
Figure 3B:
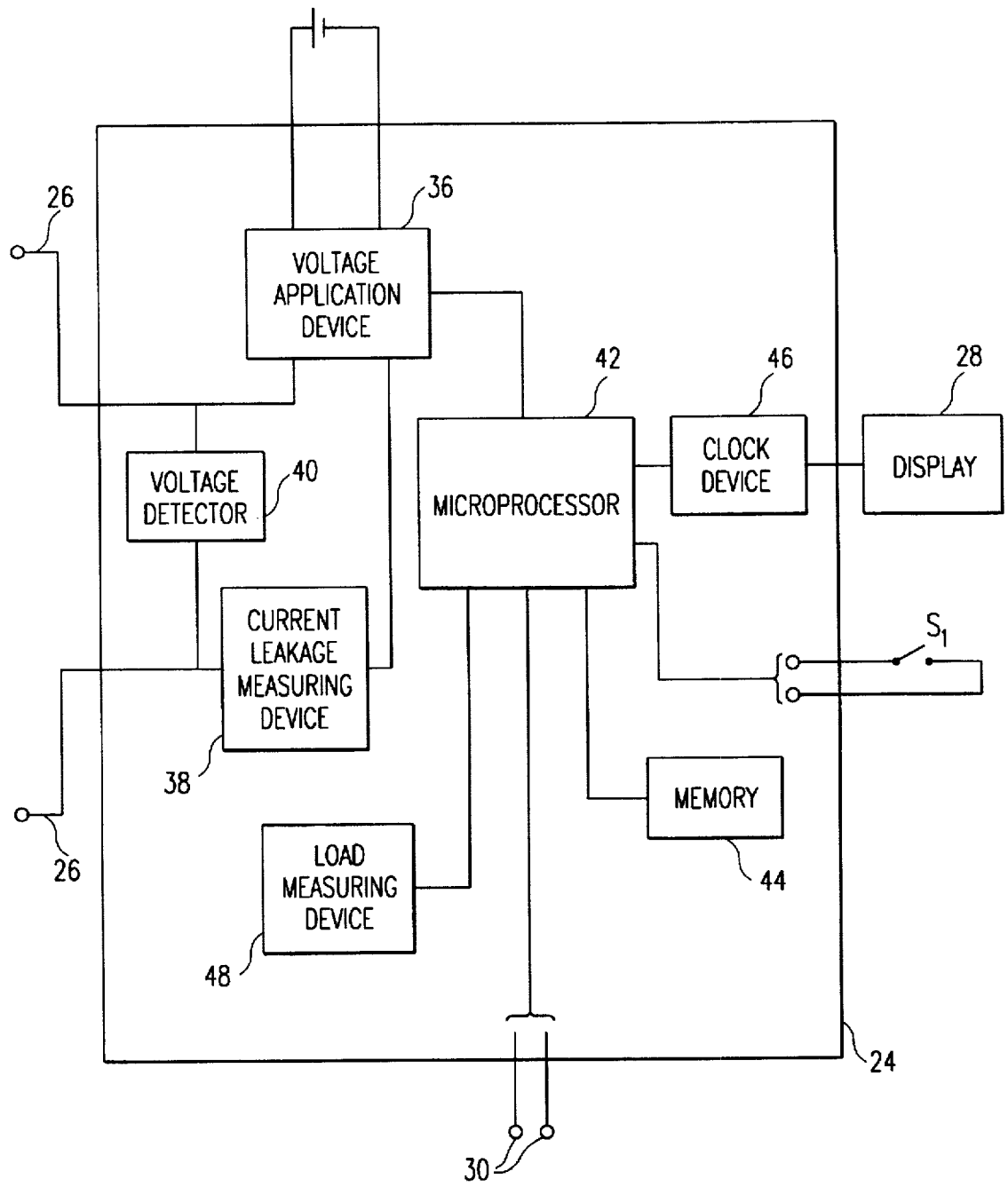

FIG. 3A shown schematically an electronic testing and monitoring system;

FIG. 3B schematically shows an electronic module in accordance with an embodiment of the present invention.

Figure 4:
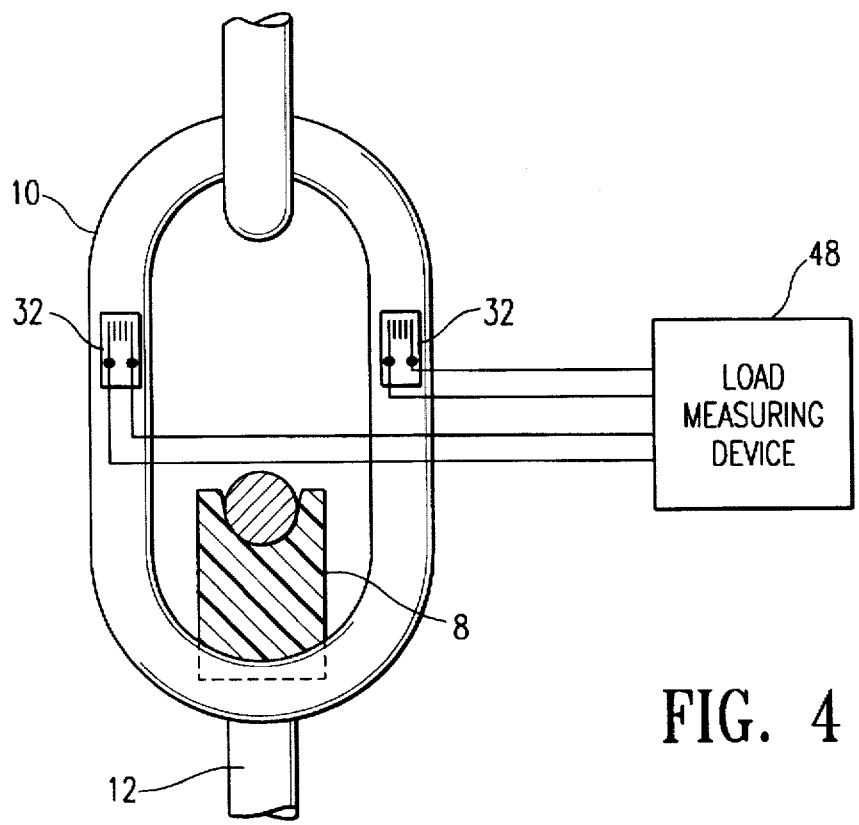
Figure 5:
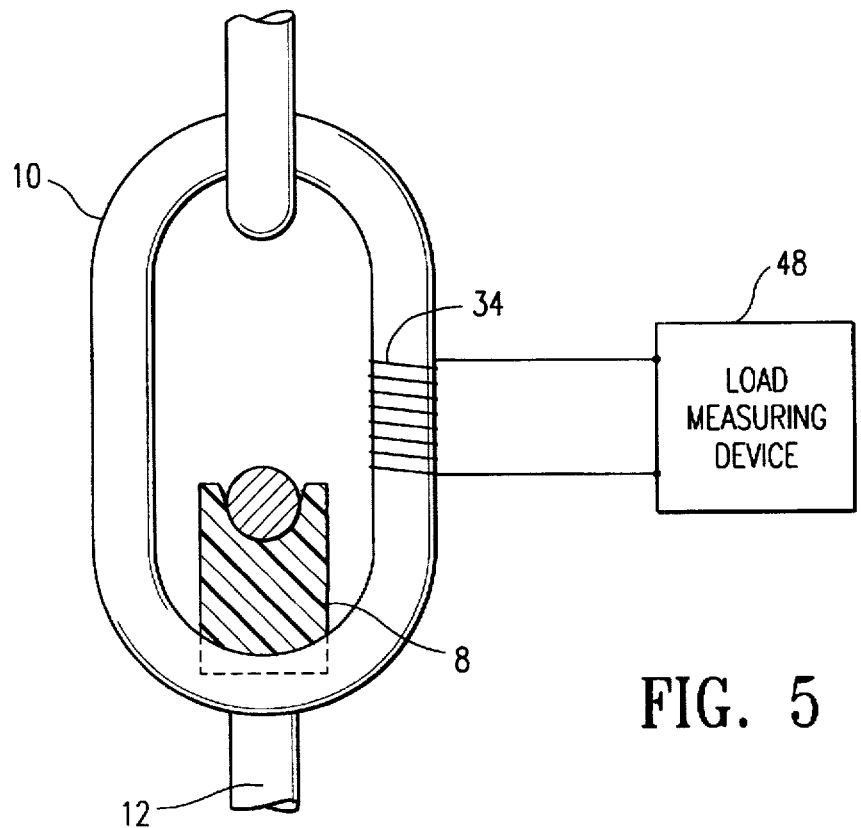
Figure 6:
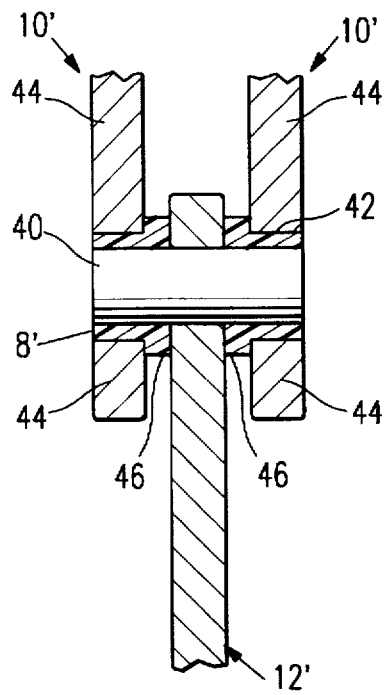
Figure 7:
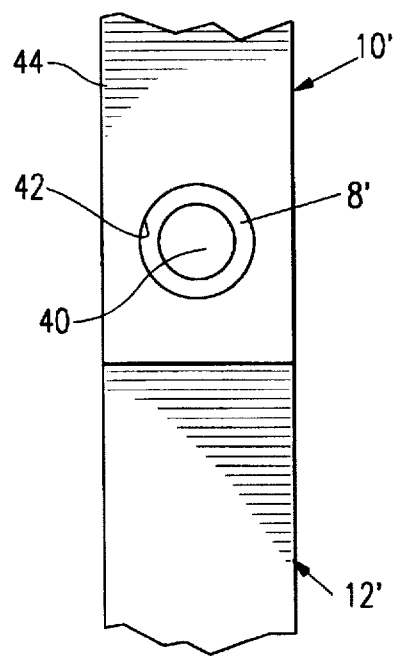

FIG. 4 shows a further embodiment of the invention additionally incorporating a strain gauge;

FIG. 5 shows a still further embodiment of the invention additionally incorporating an alternative form of sensing means;

FIG. 6 is a cross-sectional view of an alternative embodiment of the invention; and FIG. 7 is a side view of the embodiment of FIG. 6.

DESCRIPTION OF THE PREFERRED EMBODIMENT

Figure 1A:
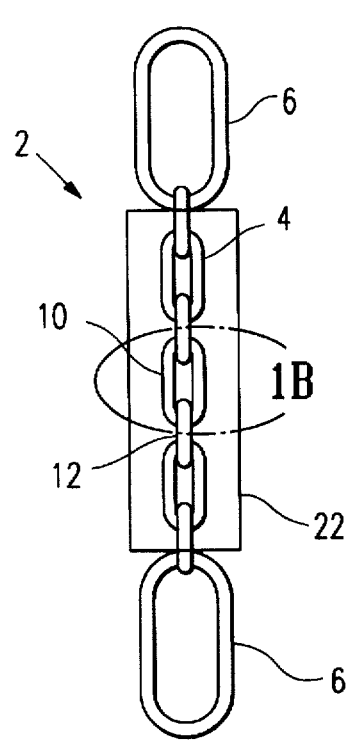
FIG. 1 is a view of a first embodiment of the invention showing, enlarged, a detail of chain links and of an insulative insert.
Figure 1B:
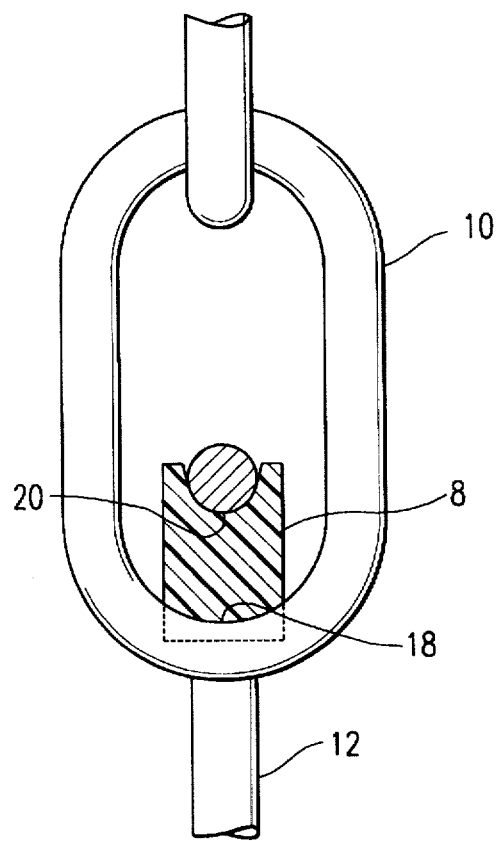

Turning to FIG. 1, a load insulator 2 in accordance with the invention is shown. The load insulator 2 comprises a load-bearing support in the form of a plurality of mechanical links 4 of oval or race-track shape, having a fixing devices, such as, for example, larger sized links 6 arranged at each end of the chain. These links may be standard steel links available commercially in a large number of different load capacities. These larger sized links 6 are for attachment or fixing to a lifting apparatus and to an applied load, respectively so that the load insulator is interposed in a load transmission path between the lifting apparatus and suspended load.

Between two of the links 4 is arranged an insulative insert 8. This insert 8 is shown provided between links numbered 10 and 12 in FIG. 1. The insert 8 could alternatively be fitted between other pairs of links 4 or between a link 4 and a larger-sized link 6. Alternatively, more than one insert 8 could be provided. The insert, 8 is formed of a material which is electrically insulative at the voltages which might occur should an electrical power line be contacted (typically, 240 volts or 330 volts). The material must also have a good mechanical strength properties. A suitable material is a composite of a plastics material such as the synthetic resin Tufnol (trade mark). The insert 8 is arranged fitted between links 10 and 12 so as to maintain these spaced from each other, and therefore electrically isolated from each other. In a loaded condition, insert 8 is be subjected to a compressive force.

Figure 2:
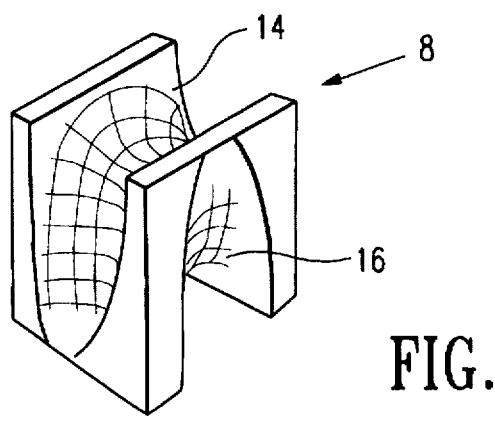
FIG. 2 is a view of the insulative insert.

As best seen in FIG. 2, the insert 8 comprises a member having curved saddle-shaped surfaces 14 and 16. These saddle-shaped surfaces are inverted with respect to each other, and twisted by 90° about an axis which in use is parallel to the length of the chain. The surface 16 engages an inwardly-directed lower portion 18 of an upper link 10, whilst the surface 14 engages an inwardly directed surface of an upper portion of a lower link 12. That is to say, the insert fits between opposed, otherwise engaging, surfaces 18,20 of the interlocked links 10,12. In FIG. 2 the cross-section of the curved surfaces 14,16 is generally curved or U-shaped, to accept the circular section of the links 4, although it links of a different section were employed, correspondingly-shaped surfaces would be preferably employed. Although it is the case that the load insulator would normally be used in a vertical orientation with a load freely suspended therefrom, it will be appreciated that the load insulator could alternatively be used in certain applications in a horizontal orientation.

A housing 22 encloses the plurality of chain links 4 and insert 8, so that at least the larger-sized links 6 or portions thereof are free for attachment of the load insulator 2 into a loaded line. The housing 22 comprises a tubular member into which the links 4 and insert 8 are introduced, with a foam-like material subsequently inserted which sets to restrict the movement of links 4 and insert 8 to some degree.

The load insulator 2 is additionally provided with associated electronics which serve three primary functions: firstly, to provide monitoring of the insulative properties; secondly, to allow for recording of incidences of electrical strikes; and thirdly, to provide a lifetime expiry indication to limit the period of use of the load insulator 2 for safety reasons.

FIG. 3A and FIG. 3B show schematically means for providing these functions. An electronic module 24 is connected to the chain links 4 at positions on opposite sides of the insulative insert 8 via connections 26. The module 24 includes means 36 for applying a voltage across insert 8, and means 38 for measuring the current leakage, which will be indicative of the resistance and hence insulative condition of the insert 8. It may be arranged that the insulative condition is continuously monitored, or alternatively that prior to use a test mode is initiated by manually closing switch $S_1$, and assuming the insert resistance is above a predetermined value, an "OK" signal is output to a display 28, indicating to a user that the load insulator 2 is safe for use. The display 28 may be an LED or LCD display.

The electronic module 24 also includes voltage measuring means 40 and a microprocessor 42 having memory means 44 arranged to record the electrical history of the device, and in particular whether a device has been subjected to an electrical strike, detected by the voltage measuring means, and if so recording the day and time of the event. Data ports 30 allow for external communication with the microprocessor to retrieve the device history. Clock means 46 are provided to indicate via the display 26 when the device has been used for a predetermined period of time, or for a predetermined number of times. It may be arranged that the display merely indicates to a user that the device must be returned to the manufacturers for recalibration and testing purposes, for example annually, or alternatively it might be arranged that the device is made inoperative. This provides an important safety function.

The load insulator may also be combined with a device 48 for measuring or monitoring of applied load. Load measuring devices are disclosed in applicants' GB 2205411A and GB 2246199A, the disclosures of which are hereby incorporated herein by reference. In both of these references, a load measuring device is provided in the form of a plurality of chain links, such as is shown in FIG. 1. At least one link is provided with sensing means to give an output signal indicative of a strain on the link, and processing means are provided to process the signal and to output a signal representative of the applied load. The sensing means disclosed in GB 2205411A and GB 2246199A are preferably in the form of strain gauges, such being directly applicable to the present load insulator.

FIG. 4 shows link 10 additionally provided with strain gauges 32 disposed on sides of the link 10. These take the form of foil strain gauges which are commercially available, and which change in electrical resistance in response to applied strain on the link. As an alternative to the pair of strain gauges shown in FIG. 4, four strain gauges may be employed on a link in an arrangement as disclosed in GB 2246199A, with the associated electronics, so as to provide increased accuracy of measurement.

FIG. 5 shows an alternative sensing means which comprises a coil 34. Changes in applied stress and hence strain on the link 10 give rise to changes in the electromagnetic properties of the link 10 which are detected by a change in a current passing through the coil 34.

Processing means for processing signals from the strain gauges may be incorporated in or in part combined with the electronics of the load insulator, and contained within the single housing 22 in order to constitute as a stand-alone unit a combined load insulator/load measuring device.

FIGS. 6 and 7 show an insulative insert 8' which is an alternative embodiment of the insulative insert 8 of FIGS. 1-5. The insulative insert 8' is provided between two links 10' and 12' which are coupled by a load pin 40. As best seen in the side view of FIG. 7, the load pin 40 is generally cylindrical in shape and is received in a generally cylindrical bore 42 through two spaced end members 44 of the link 10'. The insulative insert 8' is adapted to cover the outer cylindrical surface of the load pin 40 and accordingly has a generally hollow cylindrical shape. As best seen in FIG. 6, the insert 8' is also received in the end member bore 42 of the link 10' and insulates the load pin 40 (and hence the link 12') from the link 10'.

The load pin 40 supports the link 12' at a position centered between the end members 44 of the link 10'. The insulative insert 8' has ridges 46 on either side of the link 12' which insulatively space the link 12' from the end members 44 of the link 10'.

It will, of course, be understood that modifications of the present invention, in its various aspects, will be apparent to those skilled in the art, some being apparent only after study and other being matters of routine mechanical design. For example, the shape of the insulative insert may be readily modified to accommodate the shapes of different types of chain links. Other embodiments are also possible, their specific designs depending upon the particular application. As such, the scope of the invention should not be limited by the particular embodiments herein described but should be defined only the appended claims and equivalents thereof.

What I claim is:

1. A load insulator for interposition into a loaded line, the load insulator comprising:

two mechanical links;

a load pin connected to one of the two mechanical links and interlinked with the other link; and an electrical insulator arranged between the load pin and the other of the two mechanical links to electrically isolate the two mechanical links from each other.

* * * * *